O. W. & M. S. TAYLOR.
LOCKING DEVICE FOR AUTOMOBILES.
APPLICATION FILED JAN. 26, 1917.
1,284,947.
Patented Nov. 12, 1918.
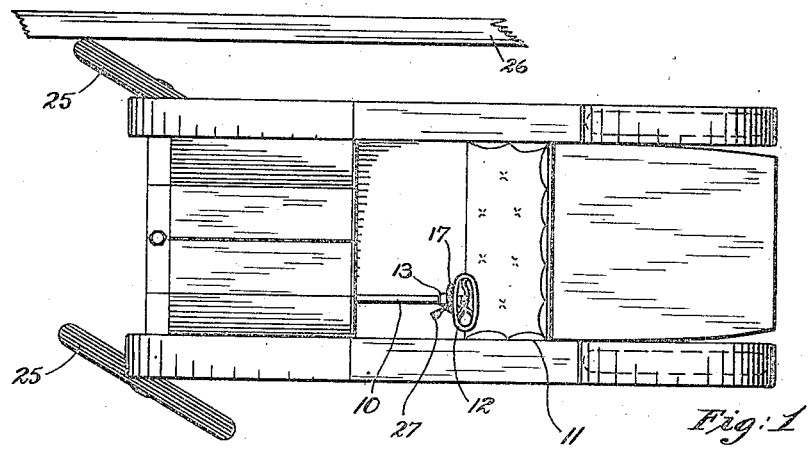
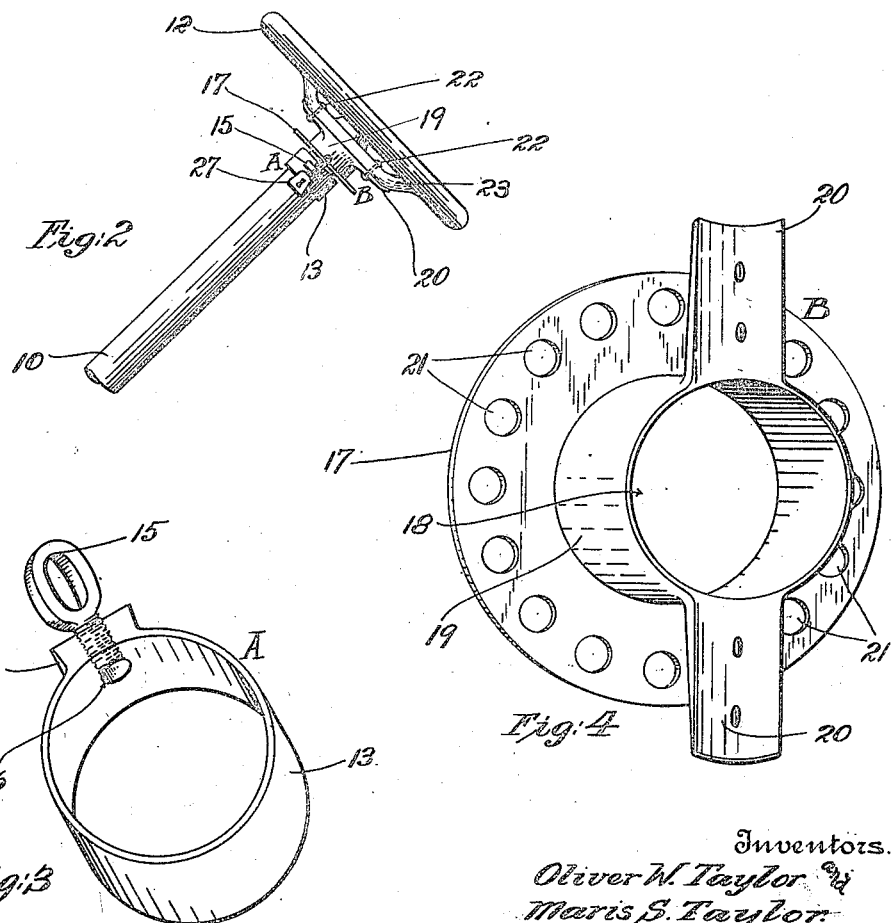
Inventors.
Oliver W. Taylor and
Maris S. Taylor
By William J. Jackson
Attorney

UNITED STATES PATENT OFFICE.

OLIVER W. TAYLOR, OF EPHRATA, AND MARIS S. TAYLOR, OF PHILADELPHIA, PENNSYLVANIA.

LOCKING DEVICE FOR AUTOMOBILES.

1,284,947.

Specification of Letters Patent.

Patented Nov. 12, 1918.

Application filed January 26, 1917. Serial No. 144,715.

*To all whom it may concern:*

Be it known that we, OLIVER W. TAYLOR and MARIS S. TAYLOR, citizens of the United States, residing at Ephrata, county of Lancaster, and State of Pennsylvania, and Philadelphia, county of Philadelphia, and State of Pennsylvania, respectively, have invented a certain new and useful Improved Locking Device for Automobiles, of which the following is a specification.

The principal object of the present invention is to provide a simple, efficient, reliable and comparatively inexpensive locking device for automobiles to prevent theft or unauthorized removal thereof. A further object of the present invention is to provide a two part attachment of which one part is fixed to an automobile steering post standard and the other part is fixed to an automobile steering wheel, means being present to interlock the two parts together to prevent movement of the steering wheel. A further object of the present invention is to provide a device of the character stated which may be readily applied to an automobile by persons other than skilled mechanics. A still further object of the present invention is to provide a device of the character stated the parts of which may be interlocked with respect to one another regardless of the position of the steering wheels of an automobile. A still further object of the present invention is to provide a device of the character stated which in no way interferes with the propulsion mechanism of an automobile and which may be applied without change of automobile construction.

With these and other objects in view the invention consists of the improvements hereinafter described and finally claimed.

The nature, characteristic features and scope of the invention will be more fully understood from the following description taken in connection with the accompanying drawings forming part hereof and in which:—

Figure 1 is a top or plan view of an automobile illustrating how an automobile steering wheel may be locked to prevent theft.

Fig. 2 is a view illustrating the application of the locking device to an automobile steering post standard and steering wheel.

Fig. 3 is a perspective view of that part of the device to be applied to the steering post standard, and Fig. 4 is a similar view of that part of the device to be applied to the steering wheel.

For the purpose of illustrating our invention, we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of the instrumentalities as herein shown and described.

In the drawings the locking device of the invention is shown as embracing a two part structure of which one part A is adapted to be fixed to the steering post standard 10 of an automobile 11 and of which the part B is adapted to be fixed to the steering wheel 12 thereof. Thus as the part A is stationary and the part B moves with the steering wheel, it will be understood that the steering wheel may be interlocked with respect to the steering post standard to prevent movement of said wheel. A description will be given, first, of the part A. This part is shown as comprising a short tubular section 13 of thin metal having formed integral therewith a lug 14 having a screw-threaded opening therethrough. Having screw-threaded relation with said opening is a screw-eye 15. In practice, the end 16 of the threaded shank of said screw-eye is mutilated as by filing so that after once screwed into said tubular section, it is relatively interlocked against removal. This part A is fitted over the top of a steering post standard 10 as shown in Fig. 2 and the screw-eye 15 tightened thus locking the tubular section to place. A description will now be given of part B. This part embraces a disk-like member 17 centrally apertured as at 18 and formed integral with which disk-like member and extended therefrom is a tubular section 19 extended from which and formed integral therewith are ears 20. These ears 20 are slightly concaved in cross-section and are somewhat thicker at their juncture points with the tubular section than at their free ends. The disk-like member is provided with an annular series of apertures 21. The above described part is secured to the underside of a steering wheel 12. In this connection it will be observed that the tubular section 19 is fitted over the hub portion of the wheel and the ears 20 riveted or otherwise secured as at 22 to the spokes 23 of the steering wheel. Note is to be made at this point that as the ears are concaved upon their upper faces, they are readily accommodated by the steering wheel spokes and that the metal of which the part B is made is sufficiently yielding in character to permit of slight bending so that the ears may, if required, be bent up sufficiently to conform to the curvature of a spoke of a steering wheel. Further such bending may be more readily accomplished because of the tapered construction of said ears. Thus positioned upon an automobile, it will be understood that as the steering wheel 12 is moved in guiding the automobile at least some of the apertures 21 of the disk-like member 17 register with the opening in the screw-eye 15 irrespective of the position of the front wheels 25 of the automobile. For instance, as shown in Fig. 1, a motorist may drive his or her car up to a curb 26 and move the front wheels 25 in toward the curb. In this position, some one of the apertures 21 are in register with the opening in screw-eye 15. The motorist now secures the steering wheel 12 with respect to the guide post or standard 10 by securing a pad-lock 27 with respect to said disk-like member 17 and screw-eye 15. The front wheels of the automobile are now locked in the position shown in said figure and any unauthorized person endeavoring to make off with the car cannot do otherwise than run the same up the curb onto the pavement. Such action immediately draws attention to the incident and precludes the possibility of theft. As the device has no connection with the propulsion mechanism, the motor may be left running if desired when parking a car. In position upon an automobile, the device is not conspicuous or detrimental to the appearance thereof because the same is practically concealed from view by the steering wheel 12.

It will now be apparent that we have devised a novel and useful construction which embodies the features of advantage enumerated as desirable in the statement of the invention and the above description and while we have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What we claim is:

In a device of the character stated the combination of a steering post standard and steering wheel of a tubular section fitted over said standard, a screw-eye having screw-threaded relation with said section for securing it to said standard, a tubular section fitted over the hub of the steering wheel, which section is provided with ears fixed to the spokes of the steering wheel and further provided with a disk-like member having an annular series of apertures and a lock for engaging the apertured portions of the two members as may be in register to interlock the same.

In testimony whereof, we have hereunto signed our names.

OLIVER W. TAYLOR.
MARIS S. TAYLOR.

Witnesses:
HELEN M. BYRNE,
CLARA E. REVENO.